Patented Aug. 5, 1952

2,606,134

UNITED STATES PATENT OFFICE 2,606,134

PROCESS OF MAKING INSULATED ELECTRICAL CONDUCTORS

Philip F. Sanders, Lima, Pa., assignor to E. I. du Pont de Nemours & Company, Wilmington, Del., a corporation of Delaware Application September 28, 1948, Serial No. 51,567

9 Claims. (Cl. 154—2.27)

This invention relates to new and improved insulated electrical conductors, and, more particularly, to an improved process for providing conductors with high temperature resistant insulation.

In many uses of electrical conductors, extremely high temperatures are encountered which limit the type of insulation that can be employed. Refractory materials, such as glass, porcelain, and other ceramics have been employed for high temperature resistant electrical wire insulation, but they are deficient in mechanical strength and are readily broken in ordinary usage, thus causing failure of the electrical equipment in which they are used. Flexible materials, such as paper, cotton, silk, and conventional organic coatings, which have been used heretofore for electrical insulation, char and decompose at relatively low temperatures.

Polytetrafluoroethylene and copolymers containing tetrafluoroethylene in substantial amounts withstand high temperatures better than any other known organic coating composition and are also superior thereto in at least one of the following properties that are desirable in insulating materials: flexibility, insolubility, chemical inertness, insulation resistance, dielectric breakdown strength, and moisture resistance. In addition, the waxy character of these materials provides an unusually high abrasion resistance not heretofore obtainable with organic coatings. The insolubility of these polymeric materials, however, has limited their application where organic coating compositions have been used in the past. For instance, in order to coat wire with these polymeric materials, since solutions of them in conventional solvents are unknown, it has been necessary to apply them as a suspensoid and to sinter this suspensoid to a continuous film (as described in my copending application, Serial No. 2,318, filed January 14, 1948).

By the terms "polymeric material" and "polymeric tape," as used hereinafter, is meant polytetrafluoroethylene and copolymers containing tetrafluoroethylene in substantial amounts, and tape made therefrom, respectively.

It has been proposed to cover conductors with sheets of polymeric material applied according to the teaching of United States Patent 2,392,388, but this method is relatively cumbersome and expensive.

It has also been proposed to cover wire with polymeric tape prepared according to the teaching of United States Patent 2,406,127, but such conductors possess physical and dielectric properties capable of improvement, because of the non-continuity of the insulation and the minute air gaps and thickness irregularities resulting when the polymeric tape is wrapped around the conductor. Furthermore, even when such conductors are provided with auxiliary coverings (such as tape which hardens in the presence of heat alone and/or glass serving or glass braid, and/or silicone or other resins), they are subject to the disadvantage that when the auxiliary coverings are loosened or stripped away, as in preparing the conductor for splicing, the polymeric tape usually unravels.

The nature of the polymeric material sheeting or tape is such that it does not fuse, adhere, or unite to itself except under the influence of relatively high temperature and pressure simultaneously applied, but heretofore there has been no convenient method of applying heat and pressure simultaneously to a continuous tape-wrapped wire.

An object of this invention is to provide a process for effectively insulating electrical conductors with the polymeric tape defined above. It is also an object to provide a process for simultaneously applying heat and pressure to a continuous electrical conductor wrapped with such polymeric tape in order to fuse the tape into a continuous insulation coating. Another object is to provide a process for using such polymeric tape as an insulating wrapper for electrical conductors in such a way that it cannot unravel when an end of the conductor is stripped of its insulation to make an electrical connection. A further object is to provide a process of insulating electrical conductors with the polymeric tape fused to form a continuous integral coating around the conductor. It is an additional object to provide a process of making polymeric material insulated electrical conductors possessing improved physical and electrical properties.

Other objects will be apparent from the following description of the invention.

These objects are accomplished by wrapping an electric conductor with the polymeric tape defined above, applying a "serving" of glass yarn or a covering of glass braid around the wrapping of polymeric tape, and heating the so-wrapped conductor to at least the fusion temperature of the polymeric material.

Conventional wire wrapping machines may be used to perform the two wrappings simultaneously at slightly separated positions on the machine.

At elevated temperature, the polymeric material expands to a greater degree than glass, the linear coefficients of thermal expansion of polytetrafluoroethylene, for instance, being about $50 \times 10^{-6}$, of glass about $8 \times 10^{-6}$, and of copper about $16 \times 10^{-6}$. The self-generated pressure resulting from the greater expansion fuses the polymeric material to itself and embeds the glass fibers in its outer surface.

A modification of this process involves applying a suspensoid containing a preponderance of polymeric material to the wire that has previously been wrapped with polymeric tape and glass yarn. When heat is subsequently applied, the fusion or sealing appears to be promoted, and some of the void spaces are filled with polymer. Although passing the wrapped conductor through a bath of the suspensoid is the most convenient method of application, other methods are operable, such as coating the conductor and/or the polymeric tape and/or the glass yarn with the suspensoid, or performing the wrapping operations in a stream of the suspensoid.

The product resulting from the above-described process, with or without the suspensoid application, is an electrical conductor covered with an insulating system which is heat resistant, relatively thin, mechanically strong, high in electrical resistance, water-, abrasion-, and char-resistant, chemically inert, insoluble, flexible, and adherent to the conductor. The insulation also possesses a high degree of "cut-through" resistance. This latter property prevents wires pressed tightly against each other from cutting through the insulation and causing short circuits. The insulation will not unravel, and it permits a clean "strip" when the covering is peeled to make a connection.

Referring to the drawings, Fig. 1 is a side elevation showing an electrical conducting wire with a wrapping of polymeric tape and a superposed wrapping of glass yarn.

The following examples illustrate preferred embodiments of this invention, and show a comparison with insulated conductors not made in accordance with the teaching of this invention.

EXAMPLE 1

Figure 1:
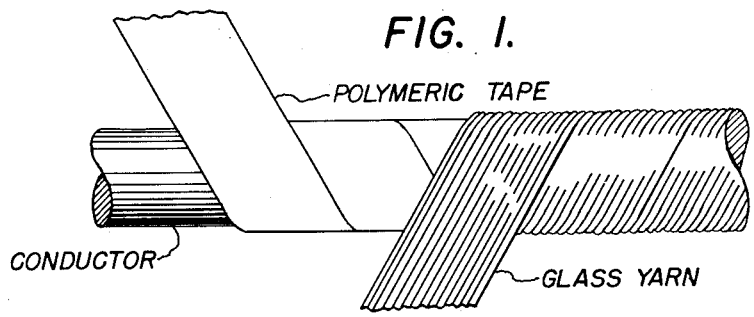
Figure 2:
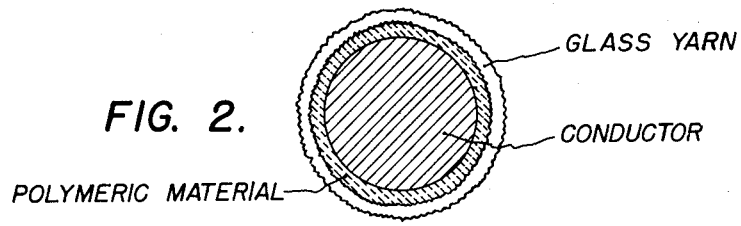
Fig. 2 is a transverse section of a wire with successive wrappings of polymeric tape and glass yarn, similar to that shown in Fig. 1, but heated to fuse the tape, the interface between the tape and yarn being irregular to show intimate contact and surface contours resulting from penetrations of the polymer into the interstices of the glass yarn.
Figure 3:
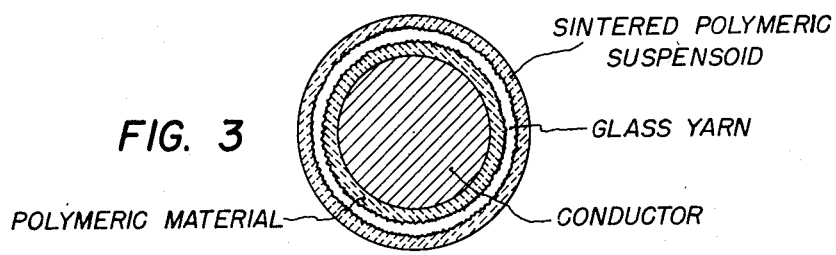
Fig. 3 is similar to Fig. 2, except that a coating of polymeric material suspensoid was applied over the tape and yarn wrapped conductor before the heating.
Figure 4:
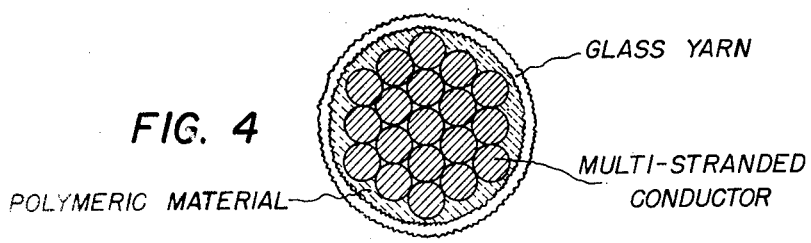
Fig. 4 is a transverse section through a multistrand cable insulated by the method of this invention and showing penetration of the polymeric material into the interstices of both the cable and the glass yarn.
Figure 5:
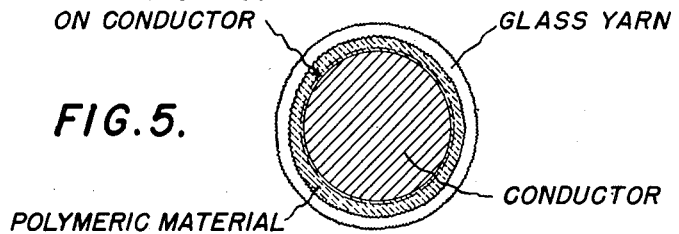
Fig. 5 is similar to Fig. 2, except that a coating of polymeric material suspensoid was applied directly over the conductor prior to wrapping the conductor with the polymeric tape.
Figure 6:
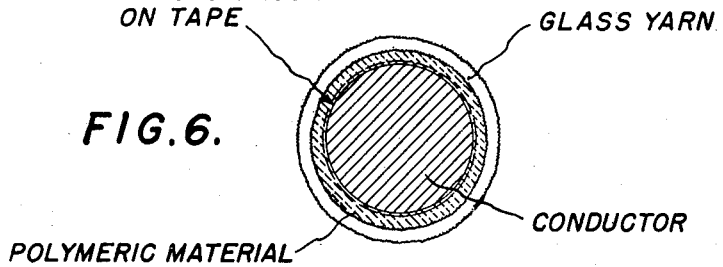
Fig. 6 is similar to Fig. 2, except that the polymeric tape was provided with a coating of polymeric material suspensoid before it was wrapped around the conductor.

The conductor to be insulated was designated as 16 gauge and consisted of 19 individual copper wires, each about 29 gauge (American wire gauge) twisted slightly to form a compact bundle. Using a conventional wire wrapping machine, this conductor was wrapped with 2 wrappings of a polytetrafluoroethylene tape 3 mils in thickness and ½ inch wide; one wrapping clockwise, the other counterclockwise. With an "overlap" of 50% each wrapping covered the core with 2 layers (6 mils) of polymeric tape, producing a 12 mil total thickness of tape. Using the same machine and performing the operation at a point just after the tape wrapping step, the wrapped core was covered in a conventional manner with a continuous woven braid of glass yarn (Owens-Corning Fiberglas Corporation's #900½ glass yarn) (see Fig. 1).

The product of this example which does not embody the present invention was a copper cable core wrapped with unfused polymeric tape that was held in place by a woven glass braid. The braid was loose and could be slipped back and forth along the cable. It frayed easily and unraveled at the ends. Other properties are recorded in Table A below.

EXAMPLE 2

The product of Example 1, after removal of a short length for test purposes, was processed according to this invention in the following manner:

The wrapped and braided wire was passed once as a continuous single strand, at the rate of 3 feet per minute, through a 3-foot long oven heated to 750° F., and then wound on a take-up spool. This fused the insulation into a continuous coating which, although adherent to the conductor, could be easily stripped to make electrical connections. The insulation did not slide along the conductor and would not fray or unravel. Other properties are recorded in Table A below.

EXAMPLE 3

This example was the same as that of Example 2 except that the wrapped and braided wire was passed a total of 5 times, as a continuous single strand, at a rate of 3 feet per minute, through a 3-foot long oven heated to 750° F. The first pass was a "dry pass" to burn sizing and lubricant off the glass yarn. After emerging from the oven, the conductor passed through a gas flame to melt down any protruding glass fibers. It was then passed through a "dip coat" suspensoid bath which was in contact with no metal other than copper to avoid galvanic action. The dip coat suspensoid was as follows:

*First coat*

| | Parts by weight |
|---|---|
| Finely divided polytetrafluoroethylene | 40.0 |
| Wetting agent | 1.6 |
| Water | 58.4 |

The wetting agent was a sodium salt of the sulphuric acid ester of a mixture of long chain alcohols (predominantly lauryl alcohol).

The conductor was again passed through the oven, was buffed with a rag, felt, or a soft buffing wheel, and returned for the second, third, and fourth coats of suspensoid, in which the ratios of ingredients were as follows:

*Second and third coats*

| | Parts by weight |
|---|---|
| Finely divided polytetrafluoroethylene | 45.0 |
| Wetting agent | 1.8 |
| Water | 53.2 |

*Fourth coat*

| | Parts by weight |
|---|---|
| Finely divided polytetrafluoroethylene | 50.0 |
| Wetting agent | 2.0 |
| Water | 48.0 |

These 3 coats of suspensoid were applied by applicator tubes, i. e., vertical cylindrical tubes containing suspensoid, through which the conductor passed vertically, each tube being provided with a tight fitting rubber nipple at the bottom. Passage of the conductor through the nipple was lubricated by a 1% aqueous solution of the above-mentioned wetting agent in the form of a bath ahead of each applicator tube. Each of the 3 applications of suspensoid was followed by a pass through the oven to sinter it. The finished insulted conductor therefore consisted of the copper wire core, fused polytetrafluoroethylene tape, glass braid, and 4 baked coats of polytetrafluoroethylene suspensoid. The insulation, which possessed all of the desirable properties of the glass-polytetrafluoroethylene suspensoid combination described in my copending application Serial No. 2,318, filed January 14, 1948, was an improvement over previous polytetrafluoroethylene tape insulation in that it was continuous, would not unravel, adhered to the metal conductor, and possessed the other properties shown in Table A below.

EXAMPLE 4

Example 3 was repeated in all respects except that a polytetrafluoroethylene suspensoid of the following composition was used for all 4 coats:

| | Parts by weight |
|---|---|
| Finely divided polytetrafluoroethylene | 80 |
| Kaolin (China clay) | 20 |
| Wetting agent of Example 3 | 4 |
| Water | 100 |

The insulated conductor resulting from this example possessed physical properties similar to those described in Examples 2 and 3 in addition to the advantage of being lower in cost than those products by virtue of the presence of an inexpensive filler. Other properties are recorded in Table A below.

TABLE A

| Product of— | Scrape Abrasion (cycles) | Insulation Resistance | | Dielectric Breakdown Strength | |
|---|---|---|---|---|---|
| | | Dry | Wet | Dry | Wet |
| | | Megohms | Megohms | Total volts | Total volts |
| Example 1 | 24 | >25,000 | <0.1 | 15,600 | <100 |
| Example 2 | 300 | >25,000 | >25,000 | 17,400 | 9,000 |
| Example 3 | >1,000 | >25,000 | >25,000 | 12,000 | 8,500 |
| Example 4 | >1,000 | >25,000 | >25,000 | 3,300 | 2,500 |

The scrape abrasion test was carried out with an apparatus that repeatedly scraped the surface of the insulated conductor with a steel wire of 0.16 inch diameter at right angles to the axis of the insulated conductor, under an 800 gram weight to force the steel wire against the conductor. The steel wire and the conductor were attached to opposite poles of a source of electricity. The scrape abrasion resistance was rated by the number of cycles (one forward plus one backward scrape) required to wear through the insulation and cause electrical contact.

The dry insulation resistance test was conducted using the apparatus specified in A. S. T. M. D-257-46. The electrical potential was established by using a mercury bath as one electrode and the insulated conductor under test as the other. An insulated portion of the conductor was immersed in the mercury so that the conductor's insulation prevented a complete circuit and made possible a measurement of the insulation resistance of the sample being tested.

The wet insulation resistance test was run using the apparatus specified in A. S. T. M. D-257-46. An insulated section of the sample was immersed for 24 hours in an aqueous solution of sodium chloride (5%) and wetting agent (1%). The wetting agent was a sodium salt of the sulfuric acid ester of a mixture of long chain alcohols (predominantly lauryl alcohol). By using this immersed insulated conductor as one electrode and introducing into the solution an electrode of opposite charge, the insulation resistance of the sample could be measured in megohms.

The dry dielectric break-down strength test was conducted using apparatus specified in A. S. T. M. D-149-46. One electrode was the insulated conductor to be tested, the other electrode being a 2 inch diameter brass one pound weight. The test piece was placed on a pad of an insulating material, and the brass electrode was placed over an insulated section of the test piece in such a way that the test piece and brass electrode were in intimate contact. An increasing electrical potential was applied until an arc occurred.

The wet dielectric break-down strength test was run using apparatus specified in A. S. T. M. D-149-46. An insulated section of the sample was immersed for 24 hours in the salt-wetting agent bath described in the wet insulation resistance test above. By using this immersed insulated conductor as one electrode, introducing another electrode into the solution, and applying an increasing electrical potential until an arc occurred, the wet dielectric breakdown point was determined.

The invention has been described with reference to insulating copper wire. It is to be understood that other electrical conductors and semiconductors, such as silver, aluminum, steel, nickel, nickel-chrome, beryllium-copper, iron-chromium, and tantalum-iron-chromium, may be insulated in accordance with this invention. The size of the wire conductor may vary over a wide range. The finest wire capable of being wrapped with polymeric tape and glass yarn may be insulated in accordance with this invention, as well as larger wires, cables, rods and bars of all commercial sizes.

The bake-oven temperature to bring about the fusion or union of the polymeric tape into a continuous integral coating will vary with linear speed of the conductor being insulated, length of oven, size and type of conductor, and particular polymeric material used. The absolute minimum temperature at which fusion of polytetrafluoroethylene occurs is 621° F., and that at which fusion of the copolymer occurs is dependent upon the proportion and fusion point of the modifying material present, and will be somewhat less than 621° F. The maximum temperature for either type of polymeric material is that at which undesirable decomposition occurs (approximately 930° F., depending upon the above mentioned variables). The minimum required to create sufficient pressure to fuse or unite the polymeric tape into a continuous covering is at least the fusion point of the polymeric material, depending mainly upon how tightly the glass serving or braid is wound, how thick the tape is, and the composition of the polymer. A loosely wound glass cover allows greater average free space for expansion of the polymer before pressure is created. Conversely, tightly wound glass allows substantially no free space, and pressure develops with a slight temperature increase. Therefore, extremely tight glass wrapping should be avoided so that excessive pressure is not developed below the fusion point, setting up undesirable stresses in the insulation. It has been found that specific precaution to avoid too loose or too tight a glass covering is not usually required in the actual machine production of glass wound wire because the tightness of the glass covering normally acceptable for other processes is within the operable limits of this invention.

While conventional wire-enameling ovens are most convenient for the baking operation of this invention, it is obvious that other combinations for supplying heat and controlling the temperature are operable.

Many combinations of insulation are intended in this invention—for instance, one or more layers of polymeric tape and/or one or more layers of glass yarn; the layers may be wrapped in the same or opposite directions; the tape and glass yarn may be of any convenient width and may be wound at any convenient angle or in any desired way to produce any degree of overlap, which in turn governs the number of thicknesses of wrapping material applied per winding operation; the glass yarn may be of any convenient size and number of filaments and may be applied as a single or multicoat serving or woven braid; fibrous wrappings other than glass yarn, possessing a low coefficient of thermal expansion relative to the polymeric material and capable of withstanding the required temperatures, are operable; also, in some cases, tape woven from glass yarn may be used and this tape may be coated or impregnated with polymeric material, if desired.

With reference to the aqueous suspensoid of polymeric material, other wetting agents than those disclosed in the examples may be used provided they are innocuous to the suspensoid.

If desired, the polymeric material dispersions can be modified by the inclusion of such inorganic materials as pigments and inert fillers, metal powder, and the like.

When a copolymer suspensoid is used in the practice of this invention, it is preferred to use a copolymer of tetrafluoroethylene and ethylene, and particularly those which contain from 60% to 85% tetrafluoroethylene. However, any copolymer containing tetrafluoroethylene in substantial amounts and another polymerizable organic compound containing an ethylenic double bond, such as olefinic hydrocarbons, halogenated ethylenes, vinyl esters of monocarboxylic acids, and alkyl esters of acrylic and methacrylic acids, may be used. In such copolymers, the dispersion medium may be a neutral ester or ketone liquid boiling above 347° F.

It is sometimes desirable to add hydrous oxides to the first coat of the polymeric material coating composition applied over the glass yarn to obtain an economic advantage. Such compositions are disclosed in copending application Serial No. 750,166, filed May 23, 1947, by C. K. Ikeda, now Patent 2,592,147.

The solids content of the liquid polymeric material coating composition may be varied over a wide range to decrease or increase the film build per coat, although the preferred range is 25% to 70% solids.

The process of this invention permits the simultaneous application of heat and pressure to a continuous electrical conductor wrapped with polymeric tape so as to quickly and efficiently produce an improved insulated conductor having many desirable properties.

The insulated wire produced in accordance with this invention has many advantages over similarly wrapped conductors that have not been further treated to fuse the wrapped materials into a continuous coating. It possesses improved dielectric properties, probably resulting from the absence of air gaps and void spaces, and the insulation does not unravel or separate between layers. The components of the insulation are firmly bonded throughout and to the metal core. The insulation will not slide along the conductor and bunch in concentrated areas yet, when the insulation of this invention is stripped off to make an electrical connection, a clean exposed metal surface will be presented. Another advantage is that there are no foreign materials present which possess less desirable characteristics, which is often the case in similar conductors insulated by wrapping. In comparison with previous wrapped wires, those insulated in accordance with this invention may be handled more roughly, wound faster, and with fewer precautions in production winding operations without danger of breaking or damaging the insulation and thereby causing failure of electrical equipment in which it is used. In the case of twisted cables containing several individual wires, and sometimes several strands of multi-wire elements, the wrapped polymeric material when treated according to this invention forces itself into the interstices of the cable. Thus air is replaced with high dielectric material and simultaneously the cable is "cast" or embedded in its insulation, which action is not obtainable in a conventional wrap-insulation procedure.

The insulated wire produced in accordance with this invention is adapted for a wide range of uses, such as high temperature-resistant magnet coils, motors, generators, transformers, resistors, cables, heating coils, switch gear, and electric control equipment. Wires insulated with glass yarn and polymeric material in accordance with this invention are particularly useful where long life and resistance to high heat, oxidation, corrosive conditions, and lubricants is important.

It is apparent that many widely different embodiments of this invention can be made without departing from the spirit and scope thereof; and, therefore, it is not intended to be limited except as indicated in the appended claims.

I claim:

1. In the process of producing an insulated electrical conductor, the improvement which comprises wrapping the conductor with a polymeric tape comprising a polymeric material selected from the group consisting of polytetrafluoroethylene and copolymers containing tetrafluoroethylene in substantial amounts, wrapping the taped conductor firmly with glass yarn, and thereafter heating said dual-wrapped conductor to at least the fusion temperature of the polymeric material, the polymeric tape being thereby fused into a continuous covering, with the covering bonded to the conductor, under the influence of heat and the pressure resulting from the thermal expansion of the polymeric material.

2. The process of claim 1 in which the polymeric tape comprises polytetrafluoroethylene.

3. The process of claim 1 in which the polymeric tape comprises a copolymer containing tetrafluoroethylene in substantial amount.

4. The process of claim 1 in which the dual-wrapped conductor is heated to 621°–930° F.

5. In the process of producing an insulated electrical conductor, the improvement which comprises coating the conductor with a suspensoid of a polymeric material selected from the group consisting of polytetrafluoroethylene and copolymers containing tetrafluoroethylene in substantial amounts, wrapping the coated conductor firmly with a polymeric tape comprising a polymeric material selected from the aforementioned group, wrapping the taped conductor with glass yarn, and thereafter heating said coated and dual-wrapped conductor to at least the fusion temperature of the polymeric material, the polymeric tape being thereby fused into a continuous covering with the covering bonded to the conductor, under the influence of heat and the pressure resulting from the thermal expansion of the polymeric material.

6. The process of claim 5 in which the polymeric material of the suspensoid is polytetrafluoroethylene.

7. The process of claim 5 in which the polymeric material of the suspensoid is a copolymer containing tetrafluoroethylene in substantial amount.

8. In the process of producing an insulated electrical conductor, the improvement which comprises coating a polymeric tape comprising a polymeric material selected from the group consisting of polytetrafluoroethylene and copolymers containing tetrafluoroethylene in substantial amounts with a suspensoid of a polymeric material selected from the aforementioned group, wrapping the conductor with the coated polymeric tape, wrapping the taped conductor firmly with glass yarn, and thereafter heating said dual-wrapped conductor to at least the fusion temperature of the polymeric material, the polymeric tape being thereby fused into a continuous covering, with the covering bonded to the conductor, under the influence of heat and the pressure resulting from the thermal expansion of the polymeric material.

9. In the process of producing an insulated electrical conductor, the improvement which comprises wrapping the conductor with a polymeric tape comprising a polymeric material selected from the group consisting of polytetrafluoroethylene and copolymers containing tetrafluoroethylene in substantial amounts, wrapping the taped conductor firmly with glass yarn, coating the dual-wrapped conductor with a suspensoid of a polymeric material selected from the aforementioned group, and thereafter heating said dual-wrapped conductor to at least the fusion temperature of the polymeric material, the polymeric tape being thereby fused into a continuous covering, with the covering bonded to the conductor, under the influence of heat and the pressure resulting from the thermal expansion of the polymeric material.

PHILIP F. SANDERS.

REFERENCES CITED

The following references are of record in the file of this patent:

UNITED STATES PATENTS

| Number | Name | Date |
|---|---|---|
| 2,370,046 | Keyes | Feb. 20, 1945 |
| 2,412,851 | Weiseman | Dec. 17, 1946 |
| 2,426,413 | Pollett | Aug. 26, 1947 |
| 2,454,625 | Bondon | Nov. 23, 1948 |
| 2,459,653 | Keyes | Jan. 18, 1949 |